United States Patent
Nakagawa et al.

(10) Patent No.: US 11,707,917 B2
(45) Date of Patent: Jul. 25, 2023

(54) MULTILAYER CO-EXTRUDED FILMS AND ARTICLE CONTAINING SAME

(71) Applicant: NITTO DENKO CORPORATION, Osaka (JP)

(72) Inventors: Muneshige Nakagawa, Ibaraki (JP); Sho Uchida, Ibaraki (JP); Shinsuke Ikishima, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 134 days.

(21) Appl. No.: 17/603,153

(22) PCT Filed: Apr. 16, 2020

(86) PCT No.: PCT/IB2020/053611
§ 371 (c)(1),
(2) Date: Oct. 12, 2021

(87) PCT Pub. No.: WO2020/212905
PCT Pub. Date: Oct. 22, 2020

(65) Prior Publication Data
US 2022/0194052 A1 Jun. 23, 2022

(30) Foreign Application Priority Data
Apr. 17, 2019 (EP) .................................. 19169801

(51) Int. Cl.
*B32B 27/08* (2006.01)
*B32B 7/022* (2019.01)
*B32B 27/18* (2006.01)
*B32B 27/30* (2006.01)
*B32B 27/32* (2006.01)

(52) U.S. Cl.
CPC .............. *B32B 7/022* (2019.01); *B32B 27/08* (2013.01); *B32B 27/18* (2013.01); *B32B 27/302* (2013.01); *B32B 27/32* (2013.01); B32B 2250/246 (2013.01); B32B 2250/40 (2013.01); B32B 2264/1022 (2020.08); B32B 2270/00 (2013.01); B32B 2307/51 (2013.01); B32B 2307/704 (2013.01); B32B 2307/732 (2013.01); B32B 2307/746 (2013.01); B32B 2555/02 (2013.01)

(58) Field of Classification Search
CPC ............ B32B 2250/02; B32B 2250/03; B32B 2250/246; B32B 2250/40; B32B 2255/00; B32B 2255/02; B32B 2264/1022; B32B 2270/00; B32B 2274/00; B32B 2307/51; B32B 2307/704; B32B 2307/732; B32B 2307/746; B32B 2555/00; B32B 2555/02; B32B 27/08; B32B 27/18; B32B 27/302; B32B 27/32; B32B 7/022
See application file for complete search history.

(56) References Cited

U.S. PATENT DOCUMENTS

| | | |
|---|---|---|
| 5,997,968 A | 12/1999 | Dries et al. |
| 6,159,584 A | 12/2000 | Eaton et al. |
| 6,531,207 B1 | 3/2003 | Eaton et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,557,147 B2 | 7/2009 | Martinez et al. |
| 7,579,408 B2 | 8/2009 | Walton et al. |
| 7,582,716 B2 | 9/2009 | Liang et al. |
| 7,592,397 B2 | 9/2009 | Markovich et al. |
| 7,608,668 B2 | 10/2009 | Li Pi Shan et al. |
| 7,622,179 B2 | 11/2009 | Patel |
| 7,622,529 B2 | 11/2009 | Walton et al. |
| 7,662,881 B2 | 2/2010 | Walton et al. |
| 7,666,918 B2 | 2/2010 | Prieto et al. |
| 7,671,106 B2 | 3/2010 | Markovich et al. |
| 7,671,131 B2 | 3/2010 | Hughes et al. |
| 7,687,442 B2 | 3/2010 | Walton et al. |
| 7,695,812 B2 | 4/2010 | Peng et al. |
| 7,714,071 B2 | 5/2010 | Hoenig et al. |
| 7,732,052 B2 | 6/2010 | Chang et al. |
| 7,737,061 B2 | 6/2010 | Chang et al. |
| 7,737,215 B2 | 6/2010 | Chang et al. |
| 7,741,397 B2 | 6/2010 | Liang et al. |
| 7,786,216 B2 | 8/2010 | Soediono et al. |
| 7,795,321 B2 | 9/2010 | Cheung et al. |
| 7,803,728 B2 | 9/2010 | Poon et al. |
| 7,842,770 B2 | 11/2010 | Liang et al. |
| 7,858,706 B2 | 12/2010 | Arriola et al. |
| 7,863,379 B2 | 1/2011 | Kapur et al. |
| 7,893,166 B2 | 2/2011 | Shan et al. |
| 7,897,689 B2 | 3/2011 | Harris et al. |
| 7,906,587 B2 | 3/2011 | Poon et al. |
| 7,910,658 B2 | 3/2011 | Chang et al. |
| 7,915,192 B2 | 3/2011 | Arriola et al. |
| 7,947,367 B2 | 5/2011 | Poon et al. |
| 7,951,882 B2 | 5/2011 | Arriola et al. |

(Continued)

FOREIGN PATENT DOCUMENTS

| CN | 1291089 | 4/2001 |
|---|---|---|
| CN | 101951863 | 1/2011 |

(Continued)

OTHER PUBLICATIONS

International Search Report issued in International Patent Application No. PCT/IB2020/053611, dated Jun. 18, 2020.

(Continued)

*Primary Examiner* — Lawrence D Ferguson
(74) *Attorney, Agent, or Firm* — Greenblum & Bernstein, P.L.C.

(57) ABSTRACT

Provided is a multilayer co-extruded film comprising at least two different elasticity layers with at least one first elasticity layer and at least one second elasticity layer having higher elasticity than the at least one first elasticity layer, wherein the first elasticity layer comprises a combination of an olefin-based elastomer and a crystalline olefin polymer, and wherein the residual strain after 100% elongation during 10 min at 23° C. of the multilayer co-extruded film is less than 15%.

14 Claims, No Drawings

(56) References Cited

U.S. PATENT DOCUMENTS

| | | |
|---|---|---|
| 7,989,543 B2 | 8/2011 | Karjala et al. |
| 8,067,319 B2 | 11/2011 | Poon et al. |
| 8,084,537 B2 | 12/2011 | Walton et al. |
| 8,119,237 B2 | 2/2012 | Peng et al. |
| 8,168,853 B2 | 5/2012 | Autran et al. |
| 8,198,374 B2 | 6/2012 | Arriola et al. |
| 8,211,982 B2 | 7/2012 | Harris et al. |
| 8,273,068 B2 | 9/2012 | Chang et al. |
| 8,273,826 B2 | 9/2012 | Walton et al. |
| 8,273,838 B2 | 9/2012 | Shan et al. |
| 8,318,864 B2 | 11/2012 | Harris et al. |
| 8,389,655 B2 | 3/2013 | Arriola et al. |
| 8,445,744 B2 | 5/2013 | Autran et al. |
| 8,609,779 B2 | 12/2013 | Harris et al. |
| 8,710,143 B2 | 4/2014 | Arriola et al. |
| 8,721,827 B2 | 5/2014 | Chang et al. |
| 8,785,551 B2 | 7/2014 | Arriola et al. |
| 8,816,006 B2 | 8/2014 | Fuchs et al. |
| 8,912,282 B2 | 12/2014 | Soediono et al. |
| 9,169,384 B2 | 10/2015 | Autran et al. |
| 9,243,090 B2 | 1/2016 | Arriola et al. |
| 9,243,140 B2 | 1/2016 | Walton et al. |
| 9,327,477 B2 | 5/2016 | Muslet et al. |
| 9,352,537 B2 | 5/2016 | Fuchs et al. |
| 9,358,759 B2 | 6/2016 | Lee et al. |
| 9,428,638 B2 | 8/2016 | DeMarco et al. |
| 9,669,606 B2 | 6/2017 | Muslet et al. |
| 9,802,392 B2 | 10/2017 | Lee et al. |
| 9,895,275 B2 | 2/2018 | Autran et al. |
| 10,213,990 B2 | 2/2019 | Nhan et al. |
| 10,500,107 B2 | 12/2019 | Autran et al. |
| 10,772,984 B2 | 9/2020 | Fakeda et al. |
| 2006/0198983 A1 | 9/2006 | Patel |
| 2006/0199006 A1 | 9/2006 | Poon et al. |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199884 A1 | 9/2006 | Hoenig et al. |
| 2006/0199887 A1 | 9/2006 | Liang et al. |
| 2006/0199896 A1 | 9/2006 | Walton et al. |
| 2006/0199897 A1 | 9/2006 | Karjala et al. |
| 2006/0199905 A1 | 9/2006 | Hughes et al. |
| 2006/0199906 A1 | 9/2006 | Walton et al. |
| 2006/0199907 A1 | 9/2006 | Chang et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Li Pi Shan et al. |
| 2006/0199931 A1 | 9/2006 | Poon et al. |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2007/0066756 A1 | 3/2007 | Poon et al. |
| 2007/0078222 A1 | 4/2007 | Chang et al. |
| 2007/0112127 A1 | 5/2007 | Soediono et al. |
| 2007/0155900 A1 | 7/2007 | Chang et al. |
| 2007/0167315 A1 | 7/2007 | Arriola et al. |
| 2007/0167578 A1 | 7/2007 | Arriola et al. |
| 2007/0202330 A1 | 8/2007 | Peng et al. |
| 2007/0219334 A1 | 9/2007 | Li Pi Shan et al. |
| 2008/0177242 A1 | 7/2008 | Chang et al. |
| 2008/0234435 A1 | 9/2008 | Chang et al. |
| 2008/0269388 A1 | 10/2008 | Markovich et al. |
| 2008/0280517 A1 | 11/2008 | Chang et al. |
| 2008/0281037 A1 | 11/2008 | Karjala et al. |
| 2008/0311812 A1 | 12/2008 | Arriola et al. |
| 2009/0042472 A1 | 2/2009 | Poon et al. |
| 2009/0105417 A1 | 4/2009 | Walton et al. |
| 2009/0247033 A1 | 10/2009 | Peng et al. |
| 2009/0258210 A1 | 10/2009 | Iyad et al. |
| 2009/0264844 A1 | 10/2009 | Autran et al. |
| 2009/0324914 A1 | 12/2009 | Liang et al. |
| 2010/0040826 A1 | 2/2010 | Autran et al. |
| 2010/0069574 A1 | 3/2010 | Shan et al. |
| 2010/0240818 A1 | 9/2010 | Walton et al. |
| 2010/0279571 A1 | 11/2010 | Poon et al. |
| 2011/0003929 A1 | 1/2011 | Soediono et al. |
| 2011/0118416 A1 | 5/2011 | Arriola et al. |
| 2011/0124818 A1 | 5/2011 | Arriola et al. |
| 2011/0144240 A1 | 6/2011 | Harris et al. |
| 2011/0152437 A1 | 6/2011 | Harris et al. |
| 2011/0177735 A1 | 7/2011 | Fasi et al. |
| 2011/0230108 A1 | 9/2011 | Arriola et al. |
| 2012/0184169 A1 | 7/2012 | Autran et al. |
| 2013/0018150 A1 | 1/2013 | Walton et al. |
| 2013/0030092 A1 | 1/2013 | Arriola et al. |
| 2013/0048204 A1 | 2/2013 | Chang et al. |
| 2013/0085234 A1 | 4/2013 | Harris et al. |
| 2013/0237938 A1 | 9/2013 | Autran et al. |
| 2014/0141228 A1 | 5/2014 | Fuchs et al. |
| 2014/0242360 A1 | 8/2014 | Muslet et al. |
| 2014/0249286 A1 | 9/2014 | Arriola et al. |
| 2015/0174869 A1 | 6/2015 | Lee et al. |
| 2015/0175793 A1 | 6/2015 | DeMarco et al. |
| 2015/0183191 A1 | 7/2015 | Nhan et al. |
| 2015/0273802 A1 | 10/2015 | Lee et al. |
| 2016/0015576 A1 | 1/2016 | Autran, Jr. et al. |
| 2017/0313034 A1 | 11/2017 | Takeda et al. |
| 2017/0320300 A1 | 11/2017 | Takeda et al. |
| 2017/0320304 A1 | 11/2017 | Takeda et al. |
| 2018/0133357 A1 | 5/2018 | Takeda et al. |
| 2018/0133951 A1 | 5/2018 | Takeda et al. |

FOREIGN PATENT DOCUMENTS

| | | |
|---|---|---|
| CN | 102146176 | 8/2011 |
| CN | 102689482 | 9/2012 |
| CN | 103906818 | 7/2014 |
| CN | 106103088 | 11/2016 |
| DE | 19548789 | 7/1997 |
| JP | H07-276588 | 10/1995 |
| JP | 2012-200906 | 10/2012 |
| JP | 2016-112877 | 6/2016 |
| JP | 2016-204625 | 12/2016 |
| JP | 2016-204634 | 12/2016 |
| WO | 2009/094506 | 7/2009 |
| WO | 2016/093303 | 6/2016 |

OTHER PUBLICATIONS

Chinese Office Action issued in Chinese patent application No. 202080028700.5 dated Feb. 11, 2023 with English translation.

MULTILAYER CO-EXTRUDED FILMS AND ARTICLE CONTAINING SAME

TECHNICAL FIELD

The present invention relates to multilayer co-extruded films and an article including the same.

BACKGROUND ART

Various stretchable laminates having included multilayer co-extruded films are proposed for materials for articles such as sanitary articles, for example, diapers and masks (see, for example, Patent Literatures 1, 2 and 3).

Such multilayer co-extruded films should be characterized by having good elasticity and good unwinding performance to be achieved by satisfactory anti-blocking properties.

However, the related-art multilayer co-extruded films for such stretchable laminates quite often have a problem in that the multilayer co-extruded films do not have a sufficient elasticity and unwinding performance.

Further, it is important for such stretchable laminate having included such multilayer co-extruded films to have an excellent feeling of touch so as to be comfortably fitted to each of various users.

CITATION LIST

Patent Literature

[PTL 1] JP 2016-112877 A
[PTL 2] JP 2016-204625 A
[PTL 3] JP 2016-204634 A

SUMMARY OF INVENTION

Technical Problem

The present invention has been made to solve the problems of the related art, and an object of the present invention is to provide multilayer co-extruded films having good elasticity and good unwinding performance. Another object of the present invention is to provide an article including such multilayer co-extruded films.

Solution to Problem

A multilayer co-extruded film according to the present invention is a multilayer co-extruded film comprising at least two different elasticity layers with at least one first elasticity layer and at least one second elasticity layer having higher elasticity than the at least one first elasticity layer, wherein the first elasticity layer comprises a combination of an olefin-based elastomer and a crystalline olefin polymer, and
wherein the residual strain after 100% elongation during 10 min at 23° C. of the multilayer co-extruded film is less than 15%.

In a preferred embodiment, the total film thickness of the multilayer co-extruded film is in the range of 30 to 60 μm.

In a further preferred embodiment, the multilayer co-extruded film comprises three layers, where first elasticity layers are arranged on both sides of the second elasticity layer. Accordingly, the first elasticity layers can also be designated as skin layers or surface layers, respectively, while the at least one second elasticity layer can be designated as core layer.

The main function of the first elasticity layers (skin layers) is to provide anti-blocking property, particularly when roll winding takes place. For that purpose, these layers should exhibit low elasticity. To the contrary, the core layer (second elasticity layer) should exhibit high elasticity. The thinner the first elasticity layers (skin layers) are, the higher the elasticity of the multilayer co-extruded film. However, then, film production will be getting worse due to deteriorated extrusion performance. Accordingly, when first elasticity layers are arranged on both sides of the second elasticity layer, i.e. a layer arrangement A/B/A (A=first elasticity layer, B=second elasticity layer), an appropriate layer ratio can be A/B/A=2.5 to 5%/90 to 95%/2.5 to 5% in terms of thickness.

In an aspect of the present invention, the residual strain after 100% elongation during 10 min at 23° C. of the multilayer co-extruded film is less than 15%.

For this measurement, a stretchable film or a laminate as for example obtained in any one of Examples and Comparative Examples indicated herein below was cut into a size of 25 mm in its widthwise direction, and was set in a tension testing machine at a distance between chucks of 50 mm in its lengthwise direction. The resultant was extended by 100% at a tension speed of 300 ram/min. After having been extended by 100%, the film or laminate, respectively, was fixed in an extended state and held at room temperature for 10 minutes. After a lapse of 10 minutes, the laminate was released from the extended state, and the initial distance between the chucks, i.e., 50 mm (A) and the length of the film after the test, i.e., (50+α) mm (B) were measured. After that, a fluctuation ratio was calculated from the expression "[{(B)−(A))/(A)]×100."

In a further preferred embodiment, the styrene-based elastomer (a) has a di-block content of less than 5%, more preferably less than 3%, even more preferably less than 1%, while the styrene-based elastomer (b) has a di-block content in the range of 10 to 20%, more preferably 10 to 15%, as measured by HPLC. For example, the following conditions can be used: equipment: HPLC-8320 produced by TOSOH Corporation; columns: KF-404HQ X 3 produced by Shodex; solvent: THF; rate: 0.35 ml/min; temp: 40° C.

As the styrene-based elastomer, any appropriate styrene-based elastomer, such as an SIS-based elastomer or an SBS-based elastomer, may be adopted. Such styrene-based elastomer is preferably an SIS-based elastomer having a particular molecular structure from the viewpoint of enabling the effects of the present invention to be further exhibited. Specifically, the SIS-based elastomer is an SIS-based elastomer including a styrene-isoprene-styrene block copolymer molecular structure having different terminal styrene block chain lengths (hereinafter sometimes referred to as "particular SIS-based elastomer") and is discriminated from a conventional SIS-based elastomer. In the present invention, when this particular SIS-based elastomer is adopted as the elastomer resin serving as a main component in the second elasticity layer, a stretchable film or laminate, respectively, which has a further sufficient holding ability in the case of being stretched to be bonded onto another material and is more excellent in feeling of touch can be provided.

In another preferred embodiment, the olefin-based elastomer in the first elasticity layer is an α-olefin based elastomer. In particular, the olefin-based polymer can include a propylene/ethylene copolymer, in particular primarily composed of isotactic propylene repeating units with random ethylene distribution.

In a further embodiment of the present invention, there is provided a multilayer co-extruded film comprising at least two different elasticity layers with at least one first elasticity layer and at least one second elasticity layer having higher elasticity than the at least one first elasticity layer, wherein the first elasticity layer comprises a combination of an olefin-based elastomer and a crystalline olefin polymer, wherein the content of said olefin-based elastomer in the first elasticity layer is in the range of 25 to 75 wt %, and the content of said crystalline olefin polymer in the first elasticity layer is in the range of 25 to 75 wt %, and the second elasticity layer comprises a combination of at least two kinds of styrene-based elastomers (a) and (b), which differ in the styrene content in that the styrene-based elastomer (a) has a styrene content in the range of 30 to 60 wt %, while the styrene-based elastomer (b) has a styrene content in the range of 10 to 29 wt %, wherein the contents of the styrene-based elastomers (a) and (b) in said second elasticity layer are in the range of 35 to 60 wt % each.

An article according to the present invention includes a multilayer co-extruded film according to the present invention.

DESCRIPTION OF EMBODIMENTS

<<First Elasticity Layer>>

As mentioned above, the first elasticity layer comprises a combination of an olefin-based elastomer and a crystalline olefin polymer, wherein the content of said olefin-based elastomer in the first elasticity layer is in the range of 25 to 75 wt %, preferably 28 to 72 wt %, more preferably 30 to 70 wt %, even more preferably 40 to 60 wt %, and the content of said crystalline olefin polymer in the first elasticity layer is in the range of 25 to 75 wt %, preferably 28 to 72 wt %, more preferably 30 to 70 wt %, even more preferably 40 to 60 wt %. This blending ratio is the result of achieving satisfactory property balance of elasticity, anti-blocking property and slitting performance. By higher blending ratio towards said crystalline olefin polymer, anti-blocking and slitting properties become better. However, elasticity is getting worse. By higher blending ratio towards said olefin-based elastomer, elasticity becomes better. On the other hand, film surface becomes sticky, so that it is difficult to slit and unwind the film roll.

As the olefin-based elastomer, any appropriate olefin-based elastomer may be adopted to the extent that the effects of the present invention are not impaired. Examples of such olefin-based elastomer include an α-olefin-based elastomer, an olefin block copolymer, an olefin random copolymer, an ethylene copolymer, a propylene copolymer, an ethylene olefin block copolymer, a propylene olefin block copolymer, an ethylene olefin random copolymer, a propylene olefin random copolymer, an ethylene propylene random copolymer, an ethylene(1-butene) random copolymer, an ethylene(1-pentene) olefin block copolymer, an ethylene(1-hexene) random copolymer, an ethylene(1-heptene)olefin block copolymer, an ethylene(1-octene)olefin block copolymer, an ethylene(1-nonene)olefin block copolymer, an ethylene(1-decene)olefin block copolymer, a propylene ethylene olefin block copolymer, an ethylene(α-olefin) copolymer, an ethylene(α-olefin) random copolymer, an ethylene(α-olefin) block copolymer, and combinations thereof. Of those, from the viewpoint of enabling the effects of the present invention to be further exhibited, an α-olefin-based elastomer is preferred. The number of kinds of the olefin-based elastomers may be only one, or may be two or more.

A preferred example of the α-olefin-based elastomer is at least one kind selected from an ethylene based elastomer, a propylene-based elastomer, and a 1-butene-based elastomer.

The α-olefin-based elastomer is also available as a commercial product. Examples of such commercial product include some products in the "VISTAMAXX" (trademark) series (such as VISTAMAXX 3980, VISTAMAXX 6102, and VISTAMAXX 3000) manufactured by ExxonMobil Corporation, and some products in the "TAFMER" (trademark) series (such as TAFMER PN-3560) manufactured by Mitsui Chemicals, Inc.

As crystalline olefin polymer, any appropriate crystalline olefin polymer may be adopted to the extent that the effects of the present invention are not impaired. A preferred example of such crystalline olefin polymer is at least one kind selected from HDPE, r-PP, homo-PP, LDPE or LLDPE. Such crystalline olefin polymers are commercially available, for example 52518 HDPE sold by National Petrochemical Company, Iran Petrochemical Commercial Company, PP756C (r-PP) sold by Thai Polypropylene Co., Ltd, under the trademark EL-Pro™], D118 homo-PP sold by Dow Chemical Co., under the trademark INSPIRE™, G03-21T LDPE sold by Petkim under the trademark PETILEN, or LL3404.48 LLDPE sold by ExxonMobil Co.

The thickness of the first elasticity layer is preferably 0.5 µm or more, more preferably 1 µm or more, still more preferably 1.5 µm or more, and preferably 10 µm or less, more preferably 7 µm or less, still more preferably 5 µm or less. For example, the thickness of the first elasticity layer is preferably in a range of 1 to 10 µm, more preferably in a range of 2 to 5 µm. When the thickness of the first elasticity layer falls within such range, a multilayer co-extruded film with superior elasticity can be provided. When first elasticity layers are arranged on both sides of the second elasticity layer, the thickness of the first elasticity layers can be the same or different.

The thickness ratio of first elasticity layer to second elasticity layer may affect residual strain and film productivity.

The ratio of the total first elasticity layer thickness to the total second elasticity layer thickness is in the range of 1:10 to 1:25, preferably in the range of 1:10 to 1:15. The total first elasticity layer thickness refers to the sum of the thicknesses of all the first elasticity layers included in the multilayer co-extruded film. The total second elasticity layer thickness refers to the sum of the thicknesses of all the second elasticity layers included in the multilayer co-extruded film.

<<Second Elasticity Layer>>

The second elasticity layer comprises a combination of at least two kinds of styrene-based elastomers (a) and (b), for example SIS-based elastomers, which differ in the styrene content in that the styrene-based elastomer (a) has a styrene content in the range of 30 to 60 wt % ("hard styrene-based elastomer"), while the styrene-based elastomer (b) has a styrene content in the range of 10 to 29 wt % ("soft styrene-based elastomer"), wherein the contents of the styrene-based elastomers (a) and (b) in said second elasticity layer are in the range of 35 to 60 wt % each (but in total not exceeding 100 wt %).

Regarding the hard styrene-based elastomer (a), the lower limit of the styrene content is 30 wt % or more, preferably 32 wt % or more, and more preferably 34 wt % or more. The upper limit of the styrene content is 60 wt % or less, preferably 55 wt % or less, and more preferably 50 wt % or less.

Regarding the soft styrene-based elastomer (b), the lower limit of the styrene content is 10 wt % or more, preferably 12 wt % or more, and more preferably 14 wt % or more. The upper limit of the styrene content is 29 wt % or less, preferably 25 wt % or less, and more preferably 21 wt % or less.

As far as the percentage of the hard styrene-based elastomer (a) in the second elasticity layer is concerned, a lower limit may be 35 wt % or more, preferably 37 wt % or more, more preferably 39 wt % or more. The upper limit of the percentage of the hard styrene-based elastomer (a) in the second elasticity layer may be 60 wt % or less, preferably 57 wt % or less, more preferably 54 wt % or less.

The number of the second elasticity layer may be one, or may be two or more.

In the present invention, as mentioned above, the at least two kinds of styrene-based-based elastomers (a) and (b) differ in the styrene content in that the styrene-based elastomer (a) has a styrene content in the range of 30 to 60 wt % ("hard styrene-based elastomer"), while the styrene-based elastomer (b) has a styrene content in the range of 10 to 29 wt % ("soft styrene-based elastomer"). For styrene based material, particularly SIS material, high styrene content material provides better elasticity. However, film forming becomes more difficult because of high melt viscosity, where in particular thickness fluctuation in machine direction can occur. Therefore, in accordance with the present invention, high styrene content grade and low one are blended in order to adjust melt viscosity for appropriate film forming, but concurrently gaining better elasticity. By adopting the at least two kinds of styrene-based elastomers (a) and (b), particularly SIS-based elastomers (a) and (b), differing in the styrene content, an excellent balance of productivity and film property can be achieved.

An important factor for film formability is melt viscosity. In this context, styrene content may be one of the factors to control melt viscosity.

Examples of the styrene-based elastomers (a) and (b) used in the present invention include products with the trade names "Quintac 3390" (styrene content=48 wt %), "Quintac SL-190" (styrene content=35 wt %), "Quintac SL-188" (styrene content=30 wt %), "Quintac 3191" (styrene content=44 wt %), "Quintac 3620" (styrene content=14 wt %), or "Quintac SL-189" (styrene content=18 wt %) manufactured by Zeon Corporation.

In the present invention, the styrene-based elastomer (a), i.e. the above "hard styrene-based elastomer", has a melt index MI of preferably from 10 g/10 min to 20.0 g/10 min measured at 200° C./5 kg, as measured in accordance with JIS K 7210, while the above "soft styrene-based elastomer" (b) has a MI of preferably from 5 g/10 min to 10.0 g/10 min measured at 200° C./5 kg as measured in accordance with JIS K 7210. When the particular SIS-based elastomers whose MI fall within the range described above are adopted, a multilayer co-extruded film which has a sufficient holding ability in the case of being stretched to be bonded onto another material and is more excellent in feeling of touch can be provided. As mentioned above, the contents of styrene-based elastomer (a) and styrene-based elastomer (b) in the high elasticity layer are in the range of 35 to 60 wt % each, preferably in the range of 40 to 55 wt %, more preferably 45 to 50 wt %.

Apart from the at least two kinds of styrene-based elastomers (a) and (b), the second elasticity layer may further contain any appropriate other component to the extent that the effects of the present invention are not impaired. Examples of such other component include any other polymer, a tackifier, a plasticizer, an antidegradant, any other pigment, a dye, an antioxidant, an antistatic agent, a lubricant, a blowing agent, a heat stabilizer, a light stabilizer, an inorganic filler, and an organic filler. The number of kinds of those components may be only one, or maybe two or more. The content of the other component in the second elasticity layer is preferably 10 wt % or less, more preferably 7 wt % or less, still more preferably 5 wt % or less, particularly preferably 2 wt % or less, more particularly preferably 1 wt % or less.

In an embodiment of the present invention, the second elasticity layer may contain a $TiO_2$/LDPE masterbatch (c) in the range of 5 to 10 wt %. Preferably, a mass ratio of the total amount of $TiO_2$ to the total amount of LDPE in said masterbatch is 50/50 to 80/20, more preferably 70/30. $TiO_2$ as white pigment is preferred by customers for hygiene products. Such $TiO_2$/LDPE masterbatches are commercially available.

In a further embodiment of the present invention, the multilayer co-extruded film does not contain any anti-blocking agent or inorganic particles, except the $TiO_2$ in the $TiO_2$/LDPE masterbatch (c).

The thickness of the second elasticity layer is preferably 25 μm or more, more preferably 30 μm or more, still more preferably 35 μm or more, and preferably 55 μm or less, more preferably 50 μm or less, still more preferably 45 μm or less. When the thickness of the second elasticity layer falls within such range, a multilayer co-extruded film with superior elasticity can be provided.

<<Production of Multilayer Co-Extruded Film>>

In production of the multilayer co-extruded film of the present invention, the second elasticity layer (core layer) and the first elasticity layer (s) (surface layer, skin layer) are directly bonded with each other. Examples of such bonding method include a method involving laminating a first elasticity layer and a second elasticity layer by T-die co-extrusion or inflation co-extrusion.

The multilayer co-extruded film of the present invention can be subjected to treatments referred to as pre-extension treatment and activation treatment as it is known in the prior art.

For example, in order to control stretch direction, as the pre-extension treatment, the multi-layer film can be stretched in a first direction at a temperature of 140 to 155° C. in a ratio of 1:3 to 1:10, and subsequently cooled to room temperature so that the film can be stretched in the stretching direction perpendicular to the first direction and remain stiff in the first stretching direction.

As activation treatment, in order to improve stretch and relax properties, the multi-layer film can be activated essentially by using a diverging disks stretching device so that the film can be stretched in a cross direction, for example, in 110 to 500% and relaxed in almost original state.

As mentioned above, there is also provided a multilayer co-extruded film comprising at least two different elasticity layers with at least one first elasticity layer and at least one second elasticity layer having higher elasticity than the at least one first elasticity layer, wherein the first elasticity layer comprises a combination of an olefin-based elastomer and a crystalline olefin polymer, wherein the content of said olefin-based elastomer in the first elasticity layer is in the range of 25 to 75 wt %, and the content of said crystalline olefin polymer in the first elasticity layer is in the range of 25 to 75 wt %, and the second elasticity layer comprises a combination of at least two kinds of styrene-based elastomers (a) and (b), which differ in the styrene content in that the styrene-based elastomer (a) has a styrene content in the range of 30 to 60 wt %, while the styrene-based elastomer (b) has a styrene content in the range of 10 to 29 wt %, wherein the contents of the styrene-based elastomers (a) and (b) in said second elasticity layer are in the range of 35 to 60 wt % each.

Regarding this embodiment, all the statements already made above also apply to the multilayer co-extruded film according to this aspect.

<<Application of Multilayer Co-Extruded Film>>

The multilayer co-extruded films of the present invention can be used in any appropriate article in which the effects of the present invention can be effectively utilized. That is, the article of the present invention includes a multilayer co-extruded film of the present invention. A typical example of such article is a sanitary article. Examples of such sanitary article include a diaper (particularly an ear portion of a disposal diaper), a supporter, and a mask.

EXAMPLES

The present invention is hereinafter specifically described by way of Examples and Comparative Examples. However, the present invention is by no means limited by these Examples. In the Examples and Comparative Examples, test and evaluation methods are as described below. In addition, "part(s)" means "part (s) by weight" and "%" means "wt %" unless otherwise stated.

Example 1

A formulation of 50 wt % of a α-olefin-based elastomer resin (manufactured by ExxonMobil, trade name: VISTAMAXX 3980) and 50 wt % of a crystalline olefin polymer resin (manufactured by National Petrochemical Company, Iran Petrochemical Commercial Company, trade name: 52518) was loaded into A layer, and a formulation of 46.5 wt % of a SIS-based elastomer resin (manufactured by Zeon Corporation, trade name: Quintac 3390, styrene content=48 wt %, MFR=14.0 g/10 min) and 46.5 wt % of a SIS-based elastomer resin (manufactured by Zeon Corporation, trade name: Quintac 3620, styrene content=14 wt %, Di-block content=12 wt %, MFR=9.0 g/10 min) and 7 wt % of a $TiO_2$/LDPE masterbatch (Titanium oxide, manufactured by Ampacet, trade name: White PE MB 111413) was loaded into B layer in an extrusion machine to extrude an elastic film having the construction of A layer/B layer/A layer=2 μm/46 μm/2 μm in total of 50 μm. The results are shown in Table 1.

The other examples/comparative examples shown in Table 1 below were produced in essentially the same manner as Example 1.

<Evaluation of Anti-Blocking Property>

A rolled body of a multilayer co-extruded film obtained in any one of Examples and Comparative Examples was cut into a size of 30 mm in its widthwise direction, and was stored in a state at 23° C.×50RH % for 24 hours. After that, the resultant was rewound at a rewinding speed of 300 mm/min. The case where the multilayer co-extruded film ruptured at the time of the rewinding was evaluated as Poor, and the case where the multilayer co-extruded film did not rupture at the time of the rewinding was evaluated as Excellent, and the case where the multilayer co-extruded film shrank at the time of the rewinding was evaluated as good.

<Film Productivity>

In each of Examples and Comparative Examples, a multilayer film was molded with an extrusion T-die molding machine including three layers in three types (A layer/B layer/A layer). The molding was performed under the following extrusion temperature conditions.

A layer: 210° C.
B layer: 200° C.
Die temperature: 210° C.

Molding materials were subjected to co-extrusion molding from a T-die to be integrated. The resultant multilayer film was sufficiently solidified, and was then wound in a roll. Thus, a rolled body was obtained.

A film formability/productivity has been rated good when a particle or solid of resin did not appear at a die lip portion within 2 hours from starting film forming. Because a particle or solid makes uneven film thickness, i.e. poor appearance, the production must otherwise be stopped and die lip portion must be cleaned.

<Evaluation of Delamination with Nonwoven and Hot Melt Glue>

A respective laminate made of the multilayer film obtained in any one of Examples and Comparative Examples was cut into a size of 25 mm in its widthwise direction, and was stored in a state at 50° C. for 4 weeks. After that, the resultant was set in a tension testing machine at a distance between chucks of 50 mm in its lengthwise direction. The resultant was extended by broken at a tension speed of 300 mm/min. After that, the multilayer film was delaminated to non-woven at the time of the elongation was evaluated by 100% elongation as Not happened, and the case where the stretchable laminate or the laminate did not delaminate at the time of the elongation was evaluated by 100% elongation as Happened.

TABLE 1

|  | Unit | Example | | | | | | |
|---|---|---|---|---|---|---|---|---|
|  |  | 1 | 2 | 3 | 4 | 5 | 6 | 7 |
| A layer resin 1 |  | Vistamaxx 3980 | Vistamaxx 3980 | Vistamaxx 3980 | Vistamaxx 3980 | Vistamaxx 3980 | Vistamaxx 3980 | Vistamaxx 3980 |
| A layer resin 2 |  | 52518 (HDPE) | PP756C (r-PP) | G03-21T (LDPE) | 52518 (HDPE) | 52518 (HDPE) | 52518 (HDPE) | 52518 (HDPE) |
| B layer resin 3 |  | Quintac 3390 | Quintac 3390 | Quintac 3390 | Quintac 3390 | Quintac 3390 | Quintac 3390 | Quintac 3390 |
| B layer resin 4 |  | Quintac 3620 | Quintac 3620 | Quintac 3620 | Quintac 3620 | Quintac 3620 | Quintac 3620 | Quintac 3620 |
| B layer additive 5 |  | TiO2 MB (LDPE/ TiO2 = 30 wt %/70 wt %) | TiO2 MB (LDPE/ TiO2 = 30 wt %/70 wt %) | TiO2 MB (LDPE/ TiO2 = 30 wt %/70 wt %) | TiO2 MB (LDPE/ TiO2 = 30 wt %/70 wt %) | TiO2 MB (LDPE/ TiO2 = 30 wt %/70 wt %) | TiO2 MB (LDPE/ TiO2 = 30 wt %/70 wt %) | TiO2 MB (LDPE/ TiO2 = 30 wt %/70 wt %) |

TABLE 1-continued

| A layer composition 1/2 | | 50/50 | 50/50 | 50/50 | 50/50 | 50/50 | 70/30 | 30/70 |
|---|---|---|---|---|---|---|---|---|
| B layer composition 3/4/5 | | 46.5/46.5/7 | 46.5/46.5/7 | 46.5/46.5/7 | 46.5/46.5/7 | 46.5/46.5/7 | 46.5/46.5/7 | 46.5/46.5/7 |
| Layer thickness A/B/A | μm | 2/46/2 | 2/46/2 | 2/46/2 | 1.6/36.8/1.6 | 1.4/32.2/1.4 | 2/46/2 | 2/46/2 |
| Film total thickness | μm | 50 | 50 | 50 | 40 | 35 | 50 | 50 |
| Residual strain after 100% elongation during 10 min at 23 degrees C. | % | 9 | 9 | 10 | 11 | 11 | 9 | 14 |
| Anti-blocking property | | Excellent | Excellent | Excellent | Excellent | Excellent | Good | Excellent |
| Film productivity | | Excellent | Excellent | Excellent | Excellent | Excellent | Excellent | Excellent |
| Delamination with nonwoven and hot melt glue | | Not happened | Not happened | Not happened | Not happened | Not happened | Not happened | Not happened |

| | | Comparative Example | | | | |
|---|---|---|---|---|---|---|
| | Unit | 1 | 2 | 3 | 4 | 5 |
| A layer resin 1 | | Vistamaxx 3980 | — | — | Vistamaxx 3980 | Vistamaxx 3980 |
| A layer resin 2 | | — | 52518 (HDPE) | PP756C (r-PP) | CaCO3 | Behenic amide |
| B layer resin 3 | | Quintac 3390 | Quintac 3390 | Quintac 3390 | Quintac 3390 | Quintac 3390 |
| B layer resin 4 | | Quintac 3620 | Quintac 3620 | Quintac 3620 | Quintac 3620 | Quintac 3620 |
| B layer resin 5 | | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) |
| A layer composition 1/2 | | 100/0 | 0/100 | 0/100 | 80/20 | 80/20 |
| B layer composition 3/4/5 | | 46.5/46.5/7 | 46.5/46.5/7 | 46.5/46.5/7 | 46.5/46.5/7 | 46.5/46.5/7 |
| Layer thickness A/B/A | μm | 2/46/2 | 2/46/2 | 2/46/2 | 2/46/2 | 2/46/2 |
| Film total thickness | μm | 50 | 50 | 50 | 50 | 50 |
| Residual strain after 100% elongation during 10 min at 23 degrees C. | % | 8 | 17 | 18 | 9 | 8 |
| Anti-blocking property | | Poor | Excellent | Excellent | Excellent | Excellent |
| Film productivity | | Excellent | Excellent | Excellent | Poor | Excellent |
| Delamination with nonwoven and hot melt glue | | Not happened | Not happened | Not happened | Not happened | Happened |

| | | Comparative Example | | | |
|---|---|---|---|---|---|
| | Unit | 6 | 7 | 8 | 9 |
| A layer resin 1 | | — | 52518 (HDPE) | Vistamaxx 3980 | Vistamaxx 3980 |
| A layer resin 2 | | G03-21T (LDPE) | PP756C (r-PP) | 52518 (HDPE) | 52518 (HDPE) |
| B layer resin 3 | | Quintac 3390 | Quintac 3390 | Quintac 3390 | Quintac 3390 |
| B layer resin 4 | | Quintac 3620 | Quintac 3620 | Quintac 3620 | Quintac 3620 |
| B layer resin 5 | | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) |
| A layer composition 1/2 | | 0/100 | 50/50 | 20/80 | 80/20 |
| B layer composition 3/4/5 | | 46.5/46.5/7 | 46.5/46.5/7 | 46.5/46.5/7 | 46.5/46.5/7 |
| Layer thickness A/B/A | μm | 2/46/2 | 2/46/2 | 2/46/2 | 2/46/2 |
| Film total thickness | μm | 50 | 50 | 50 | 50 |
| Residual strain after 100% elongation during 10 min at 23 degrees C. | % | 19 | 19 | 16 | 7 |
| Anti-blocking property | | Excellent | Excellent | Excellent | Poor |
| Film productivity | | Excellent | Excellent | Excellent | Excellent |
| Delamination with nonwoven and hot melt glue | | Not happened | Not happened | Not happened | Not happened |

The invention claimed is:

1. A multilayer co-extruded film comprising at least two different elasticity layers with at least one first elasticity layer and at least one second elasticity layer having higher elasticity than the at least one first elasticity layer,
wherein the first elasticity layer comprises a combination of an olefin-based elastomer and a crystalline olefin polymer,
wherein the content of said olefin-based elastomer in the first elasticity layer is in the range of 25 to 75 wt %, and the content of said crystalline olefin polymer in the first elasticity layer is in the range of 25 to 75 wt %, and
wherein the residual strain after 100% elongation during 10 min at 23° C. of the multilayer co-extruded film is less than 15%.

2. The multilayer co-extruded film according to claim 1, wherein the second elasticity layer comprises a combination of at least two kinds of styrene-based elastomers (a) and (b), which differ in the styrene content in that the styrene-based elastomer (a) has a styrene content in the range of 30 to 60 wt %, while the styrene-based elastomer (b) has a styrene content in the range of 10 to 29 wt %.

3. The multilayer co-extruded film according to claim 2, wherein the contents of the styrene-based elastomers (a) and (b) in said second elasticity layer are in the range of 35 to 60 wt % each.

4. The multilayer co-extruded film according to claim 1, wherein the film comprises three layers, where first elasticity layers are arranged on both sides of the at least one second elasticity layer.

5. The multilayer co-extruded film according to claim 1, wherein the total film thickness of the multilayer co-extruded film is in the range of 30 to 60 μm.

6. The multilayer co-extruded film according to claim 1, wherein the thickness of the second elasticity layer is 25 μm or more.

7. The multilayer co-extruded film according to claim 2, wherein the styrene-based elastomer (a) has a di-block content of less than 5% and the styrene-based elastomer (b) has a di-block content in the range of 10 to 20%.

8. The multilayer co-extruded film according to claim 2, wherein the styrene-based elastomers (a) and (b) are selected from SIS-based elastomers and/or SBS-based elastomers.

9. The multilayer co-extruded film according to claim 8, wherein the styrene-based elastomers (a) and (b) are selected from SIS-based elastomers, particularly an SIS-based elastomer including a styrene-isoprene-styrene block copolymer molecular structure having different terminal styrene block chain lengths.

10. The multilayer co-extruded film according to claim 1, wherein the olefin-based elastomer in the first elasticity layer is an α-olefin based elastomer.

11. The multilayer co-extruded film according to claim 1, wherein the crystalline olefin polymer in the low elasticity layer is at least one kind selected from HDPE, r-PP, or LDPE.

12. The multilayer co-extruded film according to claim 1, wherein a ratio of the total first elasticity layer thickness and the total second elasticity layer thickness is 1:10 to 1:25.

13. A multilayer co-extruded film comprising at least two different elasticity layers with at least one first elasticity layer and at least one second elasticity layer having higher elasticity than the at least one first elasticity layer, wherein
the first elasticity layer comprises a combination of an olefin-based elastomer and a crystalline olefin polymer, wherein the content of said olefin-based elastomer in the first elasticity layer is in the range of 25 to 75 wt %, and the content of said crystalline olefin polymer in the first elasticity layer is in the range of 25 to 75 wt %, and
the second elasticity layer comprises a combination of at least two kinds of styrene-based elastomers (a) and (b), which differ in the styrene content in that the styrene-based elastomer (a) has a styrene content in the range of 30 to 60 wt %, while the styrene-based elastomer (b) has a styrene content in the range of 10 to 29 wt %, wherein the contents of the styrene-based elastomers (a) and (b) in said second elasticity layer are in the range of 35 to 60 wt % each.

14. An article which includes a multilayer co-extruded film according to claim 1.

* * * * *